United States Patent
Eguiarte Salazar et al.

(10) Patent No.: US 10,862,910 B2
(45) Date of Patent: Dec. 8, 2020

(54) PREDICTING AND MITIGATING LAYER-2 ANOMALIES AND INSTABILITIES

(71) Applicant: Cisco Technology, Inc., San Jose, CA (US)

(72) Inventors: Alejandro Alberto Eguiarte Salazar, Cary, NC (US); Nagendra Kumar Nainar, Morrisville, NC (US); Richard Furr, Fredericksburg, VA (US); Yogesh Thoppae Ramdoss, Cary, NC (US)

(73) Assignee: Cisco Technology, Inc., San Jose, CA (US)

( * ) Notice: Subject to any disclaimer, the term of this patent is extended or adjusted under 35 U.S.C. 154(b) by 349 days.

(21) Appl. No.: 15/915,335

(22) Filed: Mar. 8, 2018

(65) Prior Publication Data

US 2019/0281078 A1    Sep. 12, 2019

(51) Int. Cl.
*H04L 29/06*    (2006.01)
*H04L 12/24*    (2006.01)
*G06N 20/00*    (2019.01)

(52) U.S. Cl.
CPC ......... *H04L 63/1425* (2013.01); *G06N 20/00* (2019.01); *H04L 41/147* (2013.01); *H04L 63/162* (2013.01)

(58) Field of Classification Search
CPC .................................................. H04L 63/1425
See application file for complete search history.

(56) References Cited

U.S. PATENT DOCUMENTS

| | | | |
|---|---|---|---|
| 7,346,057 B2 * | 3/2008 | Foschiano | H04L 63/1466 370/392 |
| 8,045,474 B2 | 10/2011 | Samprathi et al. | |
| 8,261,355 B2 * | 9/2012 | Rayes | H04L 63/145 726/25 |
| 8,467,316 B1 | 6/2013 | Goli et al. | |
| 8,544,088 B2 * | 9/2013 | Schmidtke | H04L 63/1458 726/22 |
| 9,398,035 B2 | 7/2016 | Vasseur et al. | |
| 9,749,173 B2 | 8/2017 | Gautam et al. | |
| 10,200,382 B2 * | 2/2019 | Medvedovsky | H04L 63/1458 |
| 2013/0003527 A1 * | 1/2013 | Huang | H04L 12/437 370/217 |

(Continued)

*Primary Examiner* — Harris C Wang
(74) *Attorney, Agent, or Firm* — Behmke Innovation Group LLC; James M. Behmke; Jonathon P. Western

(57) ABSTRACT

In one embodiment, a server may receive both layer-2 topology information and layer-2 telemetry information from a plurality of layer-2 switches. The server may then apply behavioral learning to both the layer-2 topology information and the layer-2 telemetry information to detect layer-2 patterns that are indicative of one or more problematic layer-2 behaviors. As such, based on the behavioral learning, the server then creates predictive rules to be applied within layer-2 networks to predict the one or more problematic layer-2 behaviors. The predictive rules may then be used within a particular layer-2 network to cause i) prediction of one or more particular problematic layer-2 behaviors within the particular layer-2 network based on data from a plurality of switches within the particular layer-2 network, and ii) mitigation against the predicted one or more particular problematic layer-2 behaviors within the particular layer-2 network.

20 Claims, 10 Drawing Sheets

(56) References Cited

U.S. PATENT DOCUMENTS

| | | | |
|---|---|---|---|
| 2015/0317197 A1* | 11/2015 | Blair | H04L 41/147 |
| | | | 714/47.3 |
| 2016/0218951 A1* | 7/2016 | Vasseur | H04L 43/022 |
| 2017/0126647 A1* | 5/2017 | Zhang | H04L 63/126 |
| 2017/0295193 A1* | 10/2017 | Yang | H04L 63/1425 |
| 2017/0339022 A1* | 11/2017 | Hegde | H04L 41/142 |
| 2018/0139104 A1* | 5/2018 | Seddigh | H04L 41/0213 |
| 2018/0248795 A1* | 8/2018 | Nainar | H04L 12/4641 |
| 2019/0036954 A1* | 1/2019 | Garcia | H04L 63/1408 |
| 2019/0182127 A1* | 6/2019 | Pignataro | H04L 41/0853 |
| 2019/0281078 A1* | 9/2019 | Eguiarte Salazar | |
| | | | H04L 41/0654 |

\* cited by examiner

PREDICTING AND MITIGATING LAYER-2 ANOMALIES AND INSTABILITIES

TECHNICAL FIELD

The present disclosure relates generally to computer networks, and, more particularly, to predicting and mitigating layer-2 anomalies and instabilities.

BACKGROUND

In many computer networks (e.g., a campus, an enterprise, a data center environment, etc.), it is common to see multiple hosts sharing the same layer-2 network that spans across different switches or different sites (e.g., using overlays such as Ethernet virtual private network (EVPN), overlay transport virtualization (OTV), etc.). Although there are protocol extensions available (e.g., Border Gateway Protocol Link-State, (BGP-LS)) that provide a holistic view of a layer-3 network, there are currently no mechanisms to provide a holistic view of layer-2 network. As such, there are also no corresponding mechanisms that can intelligently manage a layer-2 network from a holistic standpoint.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a server may receive both layer-2 topology information and layer-2 telemetry information from a plurality of layer-2 switches. The server may then apply behavioral learning to both the layer-2 topology information and the layer-2 telemetry information to detect layer-2 patterns that are indicative of one or more problematic layer-2 behaviors. As such, based on the behavioral learning, the server then creates predictive rules to be applied within layer-2 networks to predict the one or more problematic layer-2 behaviors. The predictive rules may then be used within a particular layer-2 network to cause i) prediction of one or more particular problematic layer-2 behaviors within the particular layer-2 network based on data from a plurality of switches within the particular layer-2 network, and ii) mitigation against the predicted one or more particular problematic layer-2 behaviors within the particular layer-2 network.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Figure 1A:
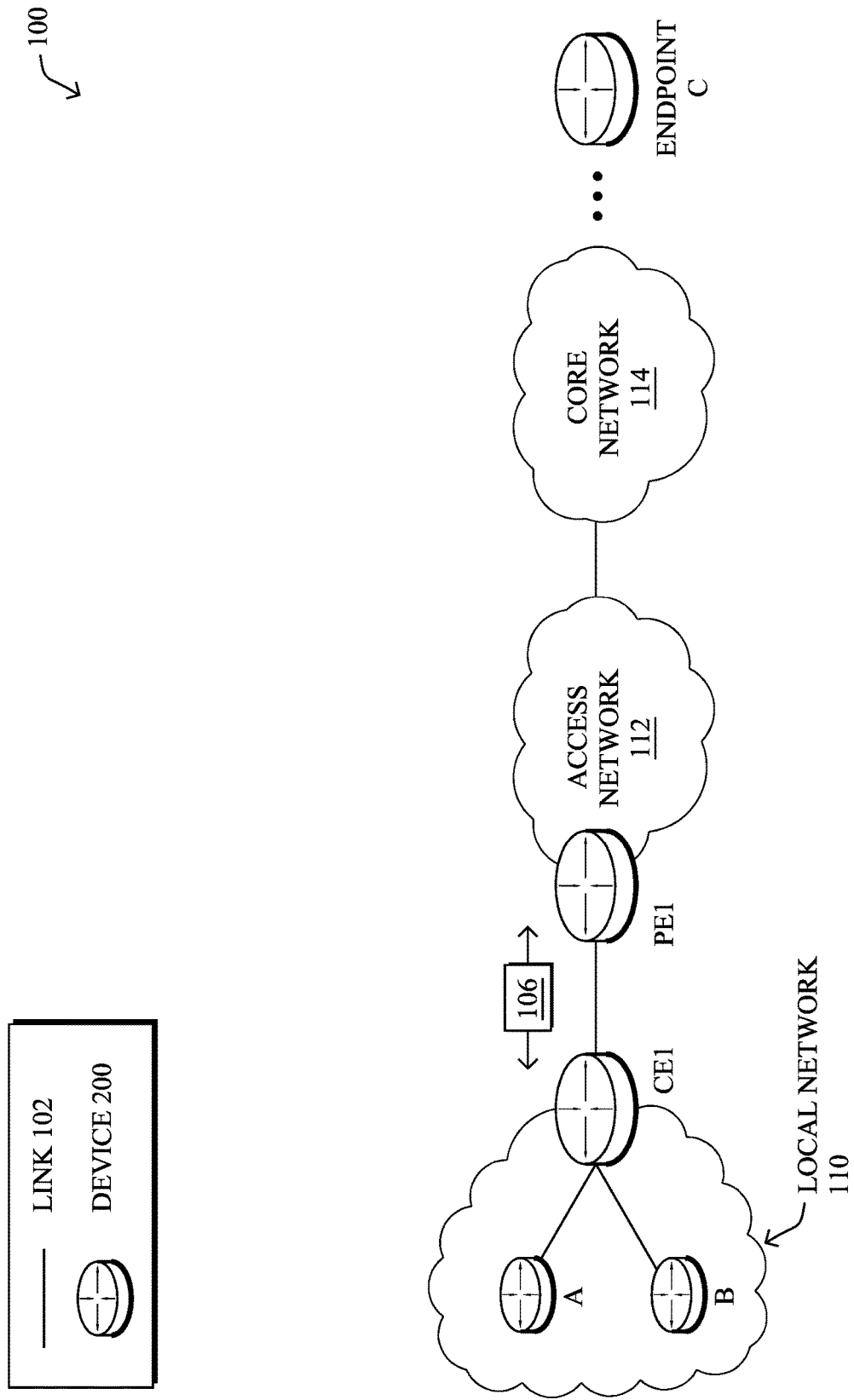
FIGS. 1A-1B illustrate an example communication network.

FIG. 1A is a schematic block diagram of an example (and simplified) communication network 100 illustratively comprising nodes/devices 200, such as a plurality of routers/devices interconnected by links and/or networks, as shown. For example, a customer edge (CE) router CE1 may interconnect nodes A and B on a local network 110 with a provider edge (PE) router PE1 of an access network 112. In turn, access network 112 may provide local network 110 with connectivity to a core network 114, such as the Internet.

The various nodes/devices 200 may exchange data packets 106 (e.g., traffic/messages) via communication network 100 over links 102 using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. For example, node A in local network 110 may communicate with an endpoint node/device C (e.g., a remote server, etc.) via communication network 100. In various embodiments, nodes/devices 200 may employ a secure communication mechanism, to encrypt and decrypt data packets 106. For example, nodes/devices 200 shown may use a Transport Layer Security (TLS) mechanism, such as the hypertext transfer protocol (HTTP) secure (HTTPS) protocol, to encrypt and decrypt data packets 106.

As would be appreciated, links 102 may include any number of wired and/or wireless connections between devices. For example, node A may communicate wirelessly using a WiFi™ connection, CE1 and PE1 may communicate wirelessly using a cellular connection or via a hardwired connection (e.g., DSL, etc.), and so on.

In addition, while certain devices are depicted in FIG. 1, the view shown is a simplified view of communication network 100, and those skilled in the art will understand that any number of nodes, devices, links, etc. may be used in the computer network, and that the view shown herein is for simplicity. In other words, communication network 100 may also include any number of intermediary networking devices such as, but not limited to, routers, switches, firewalls, etc., that are not shown.

Figure 1B:
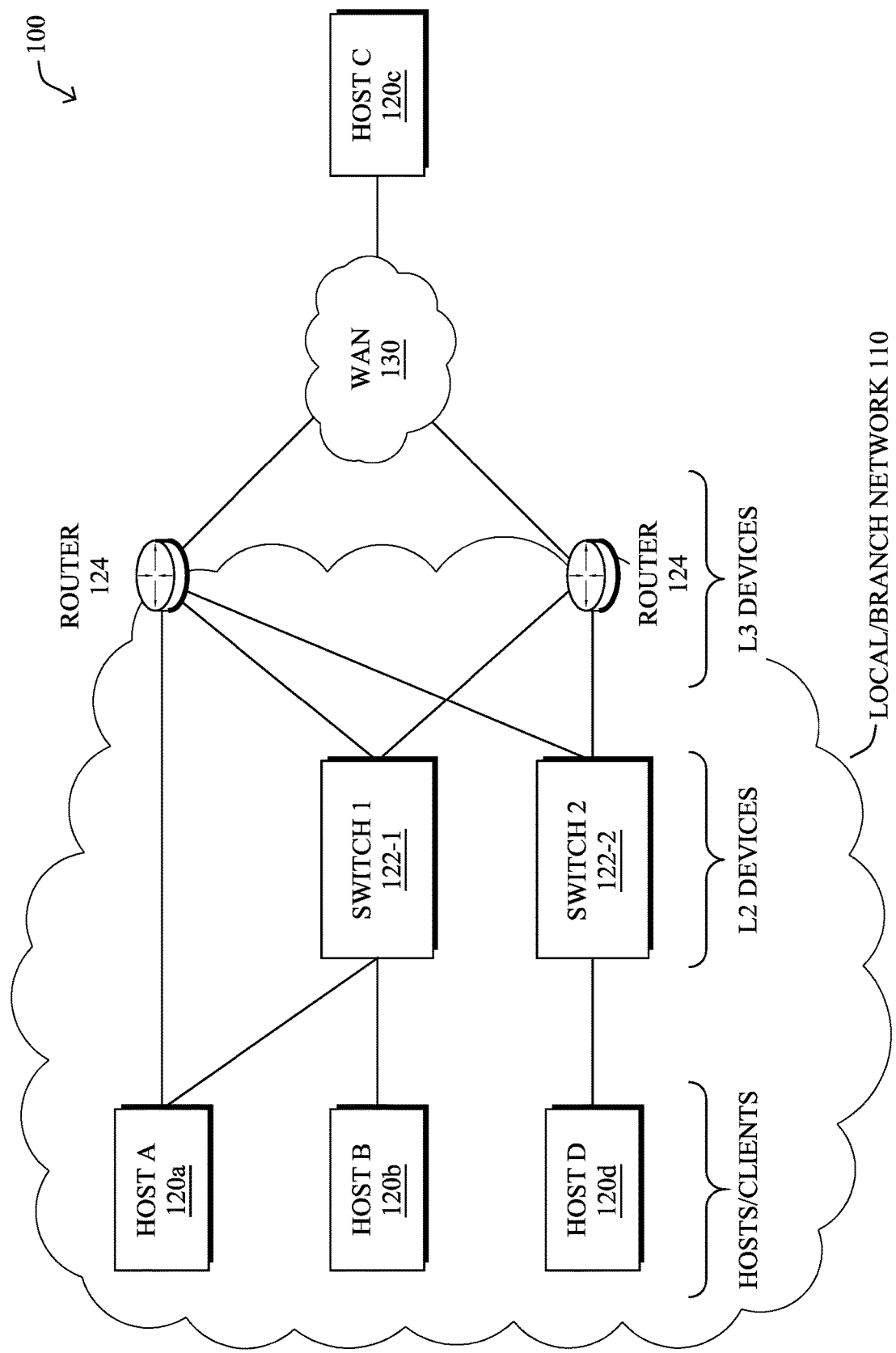

In particular, as shown in an alternative view of network 100 in FIG. 1B, local (e.g., branch) network 110 may comprise one or more hosts/clients 120 (e.g., 120a, 120b, 120d, etc.) that may communicate via layer-2 ("L2") switches 122 (e.g., Switch 1 122-1 and Switch 2 122-2) and layer-3 ("L3") routers 124 in order to reach an outside network such as WAN 130 (e.g., access network 112 and core network 114, among others). As shown, Host C (120c) may be located beyond the WAN 130, such as in another local network, a datacenter, server farm, etc. (Notably, any device within the computer networks 100, including hosts, switches, routers, etc., may be configured as a server, as may be appreciated by those skilled in the art.)

Figure 2:
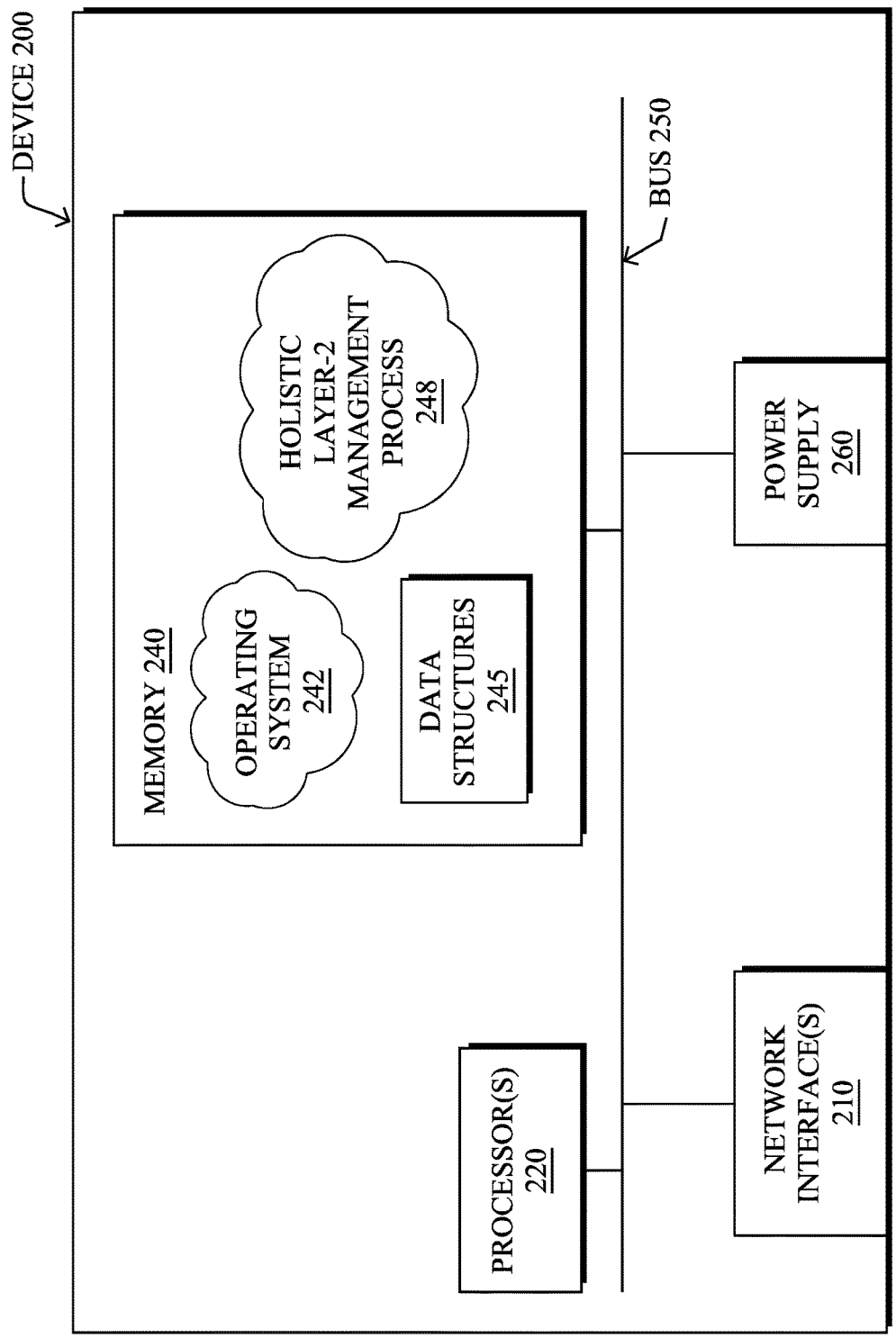
FIG. 2 illustrates an example network device/node.

FIG. 2 is a schematic block diagram of an example node/device 200 that may be used with one or more embodiments described herein, e.g., as any of the computing devices shown in FIG. 1, any other computing device that supports the operations of network 100 (e.g., servers, switches, etc.), or any of the other devices referenced below. The device 200 may also be any other suitable type of device depending upon the type of network architecture in place. As shown, device 200 comprises one or more network interface(s) 210, one or more processor(s) 220, and a memory 240 interconnected by a system bus 250 and powered by a power supply 260.

The network interface(s) 210 include the mechanical, electrical, and signaling circuitry for communicating data over physical and/or wireless links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interface(s) 210 for storing software programs and data structures associated with the embodiments described herein. The processor 220 may comprise necessary elements or logic adapted to execute the software programs and manipulate the data structures 245. An operating system 242, portions of which are typically resident in memory 240 and executed by the processor(s), functionally organizes the node by, among other things, invoking network operations in support of software processors and/or services executing on the device. These software processors and/or services may comprise a "holistic layer-2 management" process 248, as described herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

Holistic layer-2 management process 248 includes computer executable instructions that, when executed by processor(s) 220, cause device 200 to participate in the prediction and/or mitigation of layer-2 instabilities as described below. For example, holistic layer-2 management process 248 may operate on a server in conjunction with a holistic layer-2 management process 248 operating on one or more layer-2 switches, to share and assess layer-2 information for signs of instability as detailed below.

Figure 3:
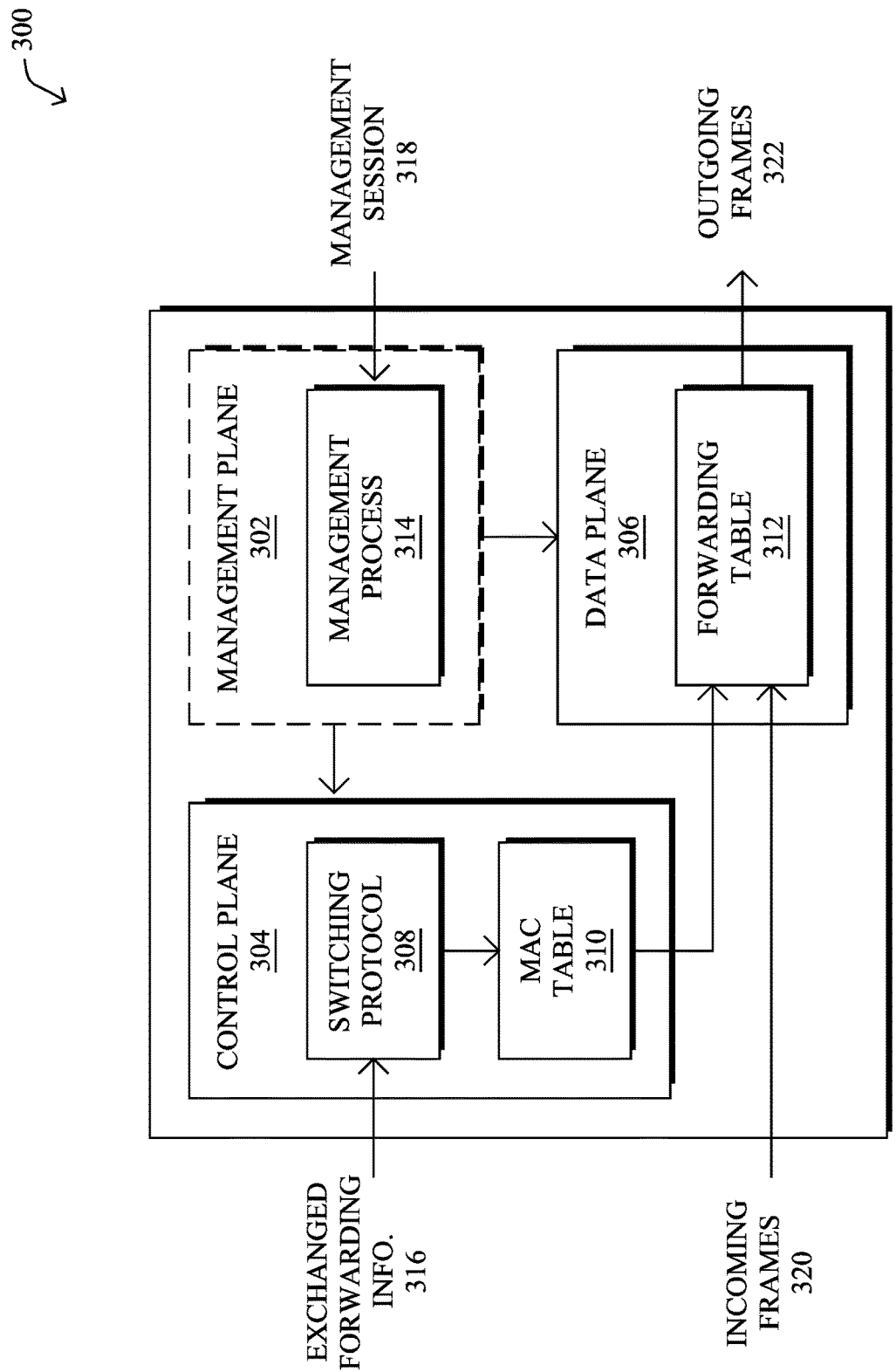
FIG. 3 illustrates an example of different operating planes of a network device.

FIG. 3 illustrates an example 300 of the operation of a network device/node (e.g., device 200), according to various embodiments. Typically, a network switch will process traffic using multiple functional planes that compartmentalize the processing of the traffic associated with a given plane. As shown, for example, a switch may divide its processing into an optional management plane 302, a control plane 304, and/or a data plane 306. Other functional planes may be used, in further implementations. While example 300 is presented primarily with respect to a network switch, similar functional divisions can be found in other networking devices as well, such as routers, etc.

Generally, optional management plane 302 allows an administrator or another supervisory device to oversee and adjust the functioning of the networking device by interacting with a management process 314. For example, an administrator may initiate a management session 318 with the networking device, to adjust the operational parameters of the device.

Control plane 304 is responsible for the signaling that controls how data/user traffic in the network is communicated across the network. For example, in the case of a layer-2 switch, control plane 304 may exchange forwarding information 316 with other switches in the network, in accordance with a switching protocol 308 (e.g., a spanning tree protocol or "STP"). Typically, exchanged forwarding information 316 can serve multiple functions such as: 1) discovering other switches in the network, 2) configuring forwarding paths in the network as part of a switching topology between the switches, and 3) signaling path/topology changes in the network (e.g., when a link between switches becomes unavailable, etc.). More specifically, one purpose of exchanged forwarding information 316 may be to populate a local media access control (MAC) table 310, which is used to determine where certain devices are connected within a layer-2 network.

Data plane 306 operates in conjunction with control plane 304 and is responsible for actually sending incoming data frames 320 in conjunction with the forwarding decisions made by control plane 304. Notably, data plane 306 may maintain a forwarding table 312 that is used to control how the device sends incoming data frames 320 as outgoing frames 322 to a particular next hop and using a particular interface. Forwarding table 312 may be populated using information from MAC table 310, as will be understood by those skilled in the art. In other words, data plane 306 may process frames intended to go through the networking device and not to the networking device itself (e.g., in contrast to control plane frames that are destined to, or locally originated by, the networking device itself).

Those skilled in the art will understand that FIG. 3 is a simplified example of operational planes of a network device, and that other arrangements may be configured. Also, while the description of FIG. 3 above generally relates to layer-2 switches, similar configuration may be described for layer-3 routers (e.g., routing tables, routing protocols, and so on).

Notably (and as described in more detail below), the device 200 may be configured to perform anomaly detection functions as part of an anomaly detection infrastructure within the network. In general, anomaly detection attempts to identify patterns that do not conform to an expected behavior. For example, in one embodiment, the anomaly detection infrastructure of the network may be operable to detect network attacks (e.g., DDoS attacks, the use of malware such as viruses, rootkits, etc.). However, anomaly detection in the context of computer networking typically presents a number of challenges: 1) a lack of a ground truth (e.g., examples of normal vs. abnormal network behavior), 2) being able to define a "normal" region in a highly dimensional space can be challenging, 3) the dynamic nature of the problem due to changing network behaviors/anomalies, 4) malicious behaviors such as malware, viruses, rootkits, etc. may adapt in order to appear "normal," and 5) differentiating between noise and relevant anomalies is not necessarily possible from a statistical standpoint, but typically also requires domain knowledge.

Anomalies may also take a number of forms in a computer network: 1) point anomalies (e.g., a specific data point is abnormal compared to other data points), 2) contextual anomalies (e.g., a data point is abnormal in a specific context but not when taken individually), or 3) collective anomalies (e.g., a collection of data points is abnormal with regards to an entire set of data points). Generally, anomaly detection refers to the ability to detect an anomaly that could be triggered by the presence of malware attempting to access data (e.g., data exfiltration), spyware, ransom-ware, etc. and/or non-malicious anomalies such as misconfigurations or misbehaving code. Particularly, an anomaly may be raised in a number of circumstances:

Security threats: the presence of a malware using unknown attacks patterns (e.g., no static signatures) may lead to modifying the behavior of a host in terms of traffic patterns, graphs structure, etc. Machine learning processes may detect these types of anomalies using advanced approaches capable of modeling subtle changes or correlation between changes (e.g., unexpected behavior) in a highly dimensional space. Such anomalies are raised in order to detect, e.g., the presence of a 0-day malware, malware used to perform data ex-filtration thanks to a Command and Control (C2 or C&C) channel, or even to trigger (Distributed) Denial of Service (DoS) such as DNS reflection, UDP flood, HTTP recursive get, etc. In the case of a (D)DoS, although technically an anomaly, the term "DoS" is usually used.

Malware may be detected based on the corresponding impact on traffic, host models, graph-based analysis, etc., when the malware attempts to connect to a C2 channel, attempts to move laterally, or exfiltrate information using various techniques.

Misbehaving devices: a device such as a laptop, a server of a network device (e.g., storage, router, switch, printer, etc.) may misbehave in a network for a number of reasons: 1) a user using a discovery tool that performs (massive) undesirable scanning in the network (in contrast with a lawful scanning by a network management tool performing device discovery), 2) a software defect (e.g. a switch or router dropping packet because of a corrupted RIB/FIB or the presence of a persistent loop by a routing protocol hitting a corner case).

Dramatic behavior change: the introduction of a new networking or end-device configuration, or even the introduction of a new application may lead to dramatic behavioral changes. Although technically not anomalous, an SLN-enabled node having computed behavioral model(s) may raise an anomaly when detecting a brutal behavior change. Note that in such as case, although an anomaly may be raised, a learning system such as SLN is expected to learn the new behavior and dynamically adapts according to potential user feedback.

Misconfigured devices: a configuration change may trigger an anomaly: a misconfigured access control list (ACL), route redistribution policy, routing policy, QoS policy maps, or the like, may have dramatic consequences such a traffic black-hole, QoS degradation, etc. Identify these forms of misconfigurations allow them to be detected and fixed.

In various embodiments, machine learning techniques may be utilized to perform anomaly detection or issue identification in the network. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

Computational entities that rely on one or more machine learning (also known as "behavioral learning") techniques to perform a task for which they have not been explicitly programmed to perform are typically referred to as learning machines. In particular, learning machines are capable of adjusting their behavior to their environment. For example, a learning machine may dynamically make future predictions based on current or prior network measurements, may make control decisions based on the effects of prior control commands, etc.

For purposes of anomaly detection in a network, a learning machine may construct a model of normal network behavior, to detect data points that deviate from this model. For example, a given model (e.g., a supervised, un-supervised, or semi-supervised model) may be used to generate and report anomaly scores to another device. Example machine learning techniques that may be used to construct and analyze such a model may include, but are not limited to, nearest neighbor (NN) techniques (e.g., k-NN models, replicator NN models, etc.), statistical techniques (e.g., Bayesian networks, etc.), clustering techniques (e.g., k-means, etc.), neural networks (e.g., reservoir networks, artificial neural networks, etc.), support vector machines (SVMs), or the like.

One class of machine learning techniques that is of particular use in the context of anomaly detection is clustering. Generally speaking, clustering is a family of techniques that seek to group data according to some typically predefined notion of similarity. For instance, clustering is a very popular technique used in recommender systems for grouping objects that are similar in terms of people's taste (e.g., because you watched X, you may be interested in Y, etc.). Typical clustering algorithms are k-means, density based spatial clustering of applications with noise (DB-SCAN) and mean-shift, where a distance to a cluster is computed with the hope of reflecting a degree of anomaly (e.g., using a Euclidian distance and a cluster based local outlier factor that takes into account the cluster density).

Replicator techniques may also be used for purposes of anomaly detection. Such techniques generally attempt to replicate an input in an unsupervised manner by projecting the data into a smaller space (e.g., compressing the space, thus performing some dimensionality reduction) and then reconstructing the original input, with the objective of keeping the "normal" pattern in the low dimensional space. Example techniques that fall into this category include principal component analysis (PCA) (e.g., for linear models), multi-layer perceptron (MLP) ANNs (e.g., for non-linear models), and replicating reservoir networks (e.g., for non-linear models, typically for time series).

According to various embodiments, graph-based models may be used for purposes of anomaly detection. Generally speaking, a graph-based model attempts to represent the relationships between different entities as a graph of nodes interconnected by edges. For example, ego-centric graphs have been used to represent the relationship between a particular social networking profile and the other profiles connected to it (e.g., the connected "friends" of a user, etc.). The patterns of these connections can then be analyzed for purposes of anomaly detection. For example, in the social networking context, it may be considered anomalous for the connections of a particular profile not to share connections, as well. In other words, a person's social connections are typically also interconnected. If no such interconnections exist, this may be deemed anomalous.

One type of network attack that is of particular concern in the context of computer networks is a Denial of Service (DoS) attack. In general, the goal of a DoS attack is to prevent legitimate use of the services available on the network. For example, a DoS jamming attack may artificially introduce interference into the network, thereby causing collisions with legitimate traffic and preventing message decoding. In another example, a DoS attack may attempt to overwhelm the network's resources by flooding the network with requests (e.g., SYN flooding, sending an overwhelming number of requests to an HTTP server, etc.), to prevent legitimate requests from being processed. A DoS attack may also be distributed, to conceal the presence of the attack. For example, a distributed DoS (DDoS) attack may involve multiple attackers sending malicious requests, making it more difficult to distinguish when an attack is underway. When viewed in isolation, a particular one of such a request may not appear to be malicious. However, in the aggregate, the requests may overload a resource, thereby impacting legitimate requests sent to the resource.

Botnets represent one way in which a DDoS attack may be launched against a network. In a botnet, a subset of the network devices may be infected with malicious software, thereby allowing the devices in the botnet to be controlled by a single master. Using this control, the master can then coordinate the attack against a given network resource.

DoS attacks are relatively easy to detect when they are brute-force (e.g. volumetric), but, especially when highly distributed, they may be difficult to distinguish from a flash-crowd (e.g., an overload of the system due to many legitimate users accessing it at the same time). This fact, in conjunction with the increasing complexity of performed attacks, makes the use of "classic" (usually threshold-based) techniques useless for detecting them. However, machine learning techniques may still be able to detect such attacks, before the network or service becomes unavailable. For example, some machine learning approaches may analyze changes in the overall statistical behavior of the network traffic (e.g., the traffic distribution among flow flattens when a DDoS attack based on a number of microflows happens). Other approaches may attempt to statistically characterizing the normal behaviors of network flows or TCP connections, in order to detect significant deviations. Classification approaches try to extract features of network flows and traffic that are characteristic of normal traffic or malicious traffic, constructing from these features a classifier that is able to differentiate between the two classes (normal and malicious).

Assume, for purposes of illustration, that a security device (e.g., a customer edge router, firewall, etc.) monitors traffic flows associated with the devices of a local network (e.g., by comparing the monitored conditions to one or more machine-learning models). For example, assume that device/node (e.g., node A) sends a particular traffic flow to a server (e.g., an application server, etc.). In such a case, the security device may monitor the packets of the traffic flow and, based on its local anomaly detection mechanism, determine that the traffic flow is anomalous. Anomalous traffic flows may be incoming, outgoing, or internal to a local network, in various cases.

In some cases, the traffic may be associated with a particular application supported by network 100. Such applications may include, but are not limited to, automation applications, control applications, voice applications, video applications, alert/notification applications (e.g., monitoring applications), communication applications, and the like. For example, traffic may be email traffic, HTTP traffic, traffic associated with an enterprise resource planning (ERP) application, etc.

In various embodiments, the anomaly detection mechanisms in network 100 may use Internet Behavioral Analytics (IBA). In general, IBA refers to the use of advanced analytics coupled with networking technologies, to detect anomalies in the network. The ability to model the behavior of a device (networking switch/router, host, etc.) will allow for the detection of malware, which is complementary to the use of a firewall that uses static signatures. Observing behavioral changes (e.g., a deviation from modeled behavior) thanks to aggregated flows records, deep packet inspection, etc., may allow detection of an anomaly such as an horizontal movement (e.g. propagation of a malware, etc.), or an attempt to perform information exfiltration.

Predicting and Mitigating Layer-2 Anomalies and Instabilities

As noted above, many computer networks have multiple hosts sharing the same layer-2 network that spans across different switches or different sites (e.g., using overlays). As also noted above, while there are protocol extensions and anomaly detection techniques available that are based on a holistic view of a layer-3 network, there are currently no mechanisms to provide a holistic view of layer-2 network, and thus no corresponding mechanisms that can intelligently manage a layer-2 network from a holistic standpoint.

By collecting a complete view of a layer-2 network ("layer 2" or "L2" network), whether large or small, and applying machine learning to that view, the techniques herein allow dynamic prediction and mitigation of many layer-2 issues that may have been previously undetectable. For example, when a MAC flap is detected in a layer-2 network, there is currently no way to identify and differentiate between an authentic user and a malicious user (who is using MAC of the authentic user), and normally results in affecting both the users. The techniques herein, therefore, define a machine learning model that uniquely uses layer-2 topology and telemetry information to predict and mitigate layer-2 instabilities and anomalies. Said differently, as described below, the techniques herein collect layer-2 topology information (e.g., by extending link-state or other out-of-band mechanism) and collect layer-2 telemetry data (e.g., MAC table data, MAC move data, spanning tree changes, EVPN states and entries, remote network virtualization edge (NVE) details, etc.), in order to apply behavioral learning on the collected information to create predictive rules that in turn can be used for various layer-2 network management use cases (e.g., MAC move detection, detecting non-legitimate user detection, MAC flooding, etc.).

Specifically, according to one or more embodiments of the disclosure as described in detail below, a server may receive both layer-2 topology information and layer-2 telemetry information from a plurality of layer-2 switches. The server may then apply behavioral learning to both the layer-2 topology information and the layer-2 telemetry information to detect layer-2 patterns that are indicative of one or more problematic layer-2 behaviors. As such, based on the behavioral learning, the server then creates predictive rules to be applied within layer-2 networks to predict the one or more problematic layer-2 behaviors. The predictive rules may then be used within a particular layer-2 network to cause i) prediction of one or more particular problematic layer-2 behaviors within the particular layer-2 network based on data from a plurality of switches within the particular layer-2 network, and ii) mitigation against the predicted one or more particular problematic layer-2 behaviors within the particular layer-2 network.

Illustratively, the techniques described herein may be performed by hardware, software, and/or firmware, such as in accordance with the illustrative "holistic layer-2 management" process 248, which may include computer executable instructions executed by the processor 220 to perform functions relating to the techniques described herein, e.g., in conjunction with one or more other processes and across one or more devices (e.g., servers and switches).

Figure 4:
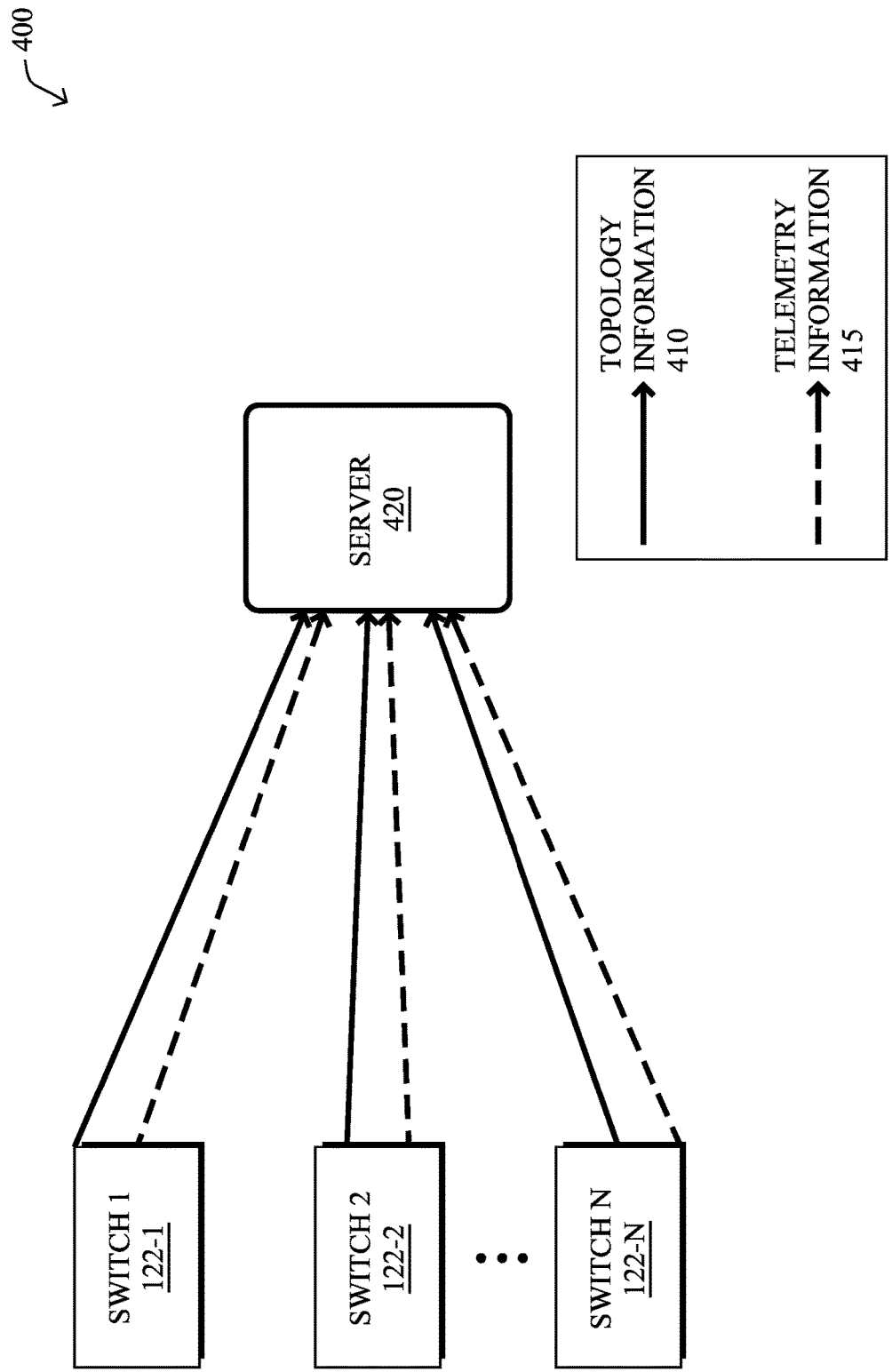
FIG. 4 illustrates an example exchange of layer-2 topology and telemetry information.

Operationally, the techniques herein generally are based on data collection, machine/behavioral learning, and then prediction/mitigation. First, and with reference to example 400 of FIG. 4, the techniques herein collect, at a server 420, layer-2 topology information 410 and layer-2 telemetry information 415 from a plurality of layer-2 switches 122 (e.g., 122-1 through 122-N).

Regarding layer-2 topology information 410, in particular, data may be collected using various mechanisms to achieve the first part of the holistic view of an end-to-end layer 2 network, such as spanning tree state, spanning tree port state, spanning tree role state, details of the connected devices, trunk ports, virtual local area networks (VLANs), allowed VLANs, etc. For instance, each switch in a given network (e.g., the network to be monitored or else a selected training network) may advertise their topology information to a centralized server 420 (e.g., a layer-2 path computation element or "PCE" server) using one or more of a variety of different mechanisms, such as:

1. Lightweight Layer-2 Link-State Protocol—This protocol will not be used to compute shortest path first (SPF) trees, but instead may be used as a communication channel to advertise a layer-2 topology database (STP roles, port states, etc.) to the server.
2. A centralized server use may use an out-of-band (OOB) mechanism (e.g., YANG, or RESTCONF protocols, as will be understood by those skilled in the art) to collect the data from the network devices.
3. Use a protocol such as NetFlow data export (NDE) to collect the spanning tree node/port state entries and other related details.

Regarding the collection of layer-2 telemetry information 415, on the other hand, each switch in the network may also periodically upload such items as the local MAC address table, changes to the table, and related event information to the centralized server, among other telemetry data (e.g., control-plane data, flow patterns, etc.). Many switches (e.g., database switches in particular) have the capability of buffering event-history on a per-MAC basis which can also be collected. There are different ways to collect the details, such as, for example:

1. Use YANG/RESTCONF protocols.
2. Use Netflow or similar protocol to export MAC address table entries (e.g., instead of L3/L4 flow entries).

Notably, the above layer-2 topology and layer-2 telemetry collection can be a "Pull model" (e.g., server periodically querying the switches) or "Push model" (e.g., switches uploading the data). In further embodiments, either topology or telemetry collection could be a hybrid model (e.g., a periodic query from a server at times, and an event-triggered data upload from switches).

Figure 5:
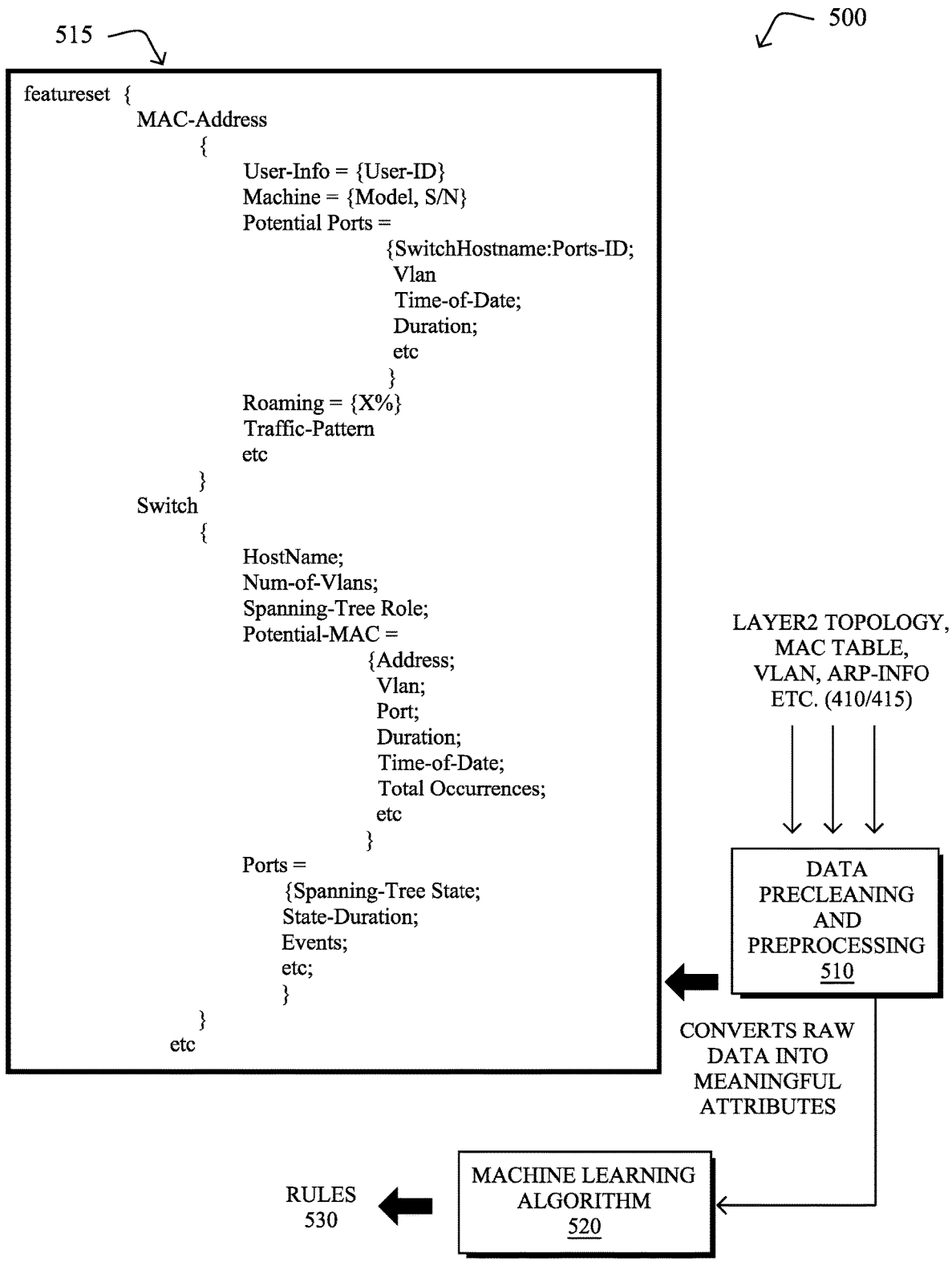
FIG. 5 illustrates an example machine learning system for creating predictive rules for predicting and mitigating layer-2 anomalies and instabilities.

Now that the server has both the topology and telemetry information, as shown in the example system 500 of FIG. 5 this information can be fed into a machine learning algorithm for data processing and learning. That is, the data collected as mentioned above (410/415) may be pre-cleaned or pre-processed (process 510, with associated pseudocode 515 for an example, as will be understood by those skilled in the art) to convert raw data into meaningful attributes, and provided to machine learning algorithm 520. As described below, a behavioral learning model may be trained with such enriched data-set, such as, e.g., the above layer-2 topology and telemetry data, as well as data-plane information (e.g., states), and other useful information. For example, the techniques herein may feed the algorithm with additional information such as VLAN configuration on each switch, address resolution protocol (ARP) information, streaming telemetry info, timestamps, etc.

The above data will be fed to a machine learning algorithm 520 to determine the patterns/behaviors, and associated rules 530, as described below:

Probabilistic Pattern={Properties, Percentile, Score} where:
Properties={Attr1, Attr2 . . . . Attrn};
Percentile=x %; and
Score={y}.
The properties may be a combination of different attributes. For example:
Attr1=MAC address;
Attr2=Switch Hostname;
Attr3=date of time;
Attr4=Duration of MAC in table;
Etc.

Percentile defines the percentage of the above attributes that should be true and the score will define the score based on the learning.

In other words, the machine/behavioral learning algorithm 520 derives a rule, such that, for example: "MAC1" on "Switch1" at date-of-time with Spanning-tree state as "State1" (which has been learned multiple times) will have a score of 80, and so on.

Figure 6:
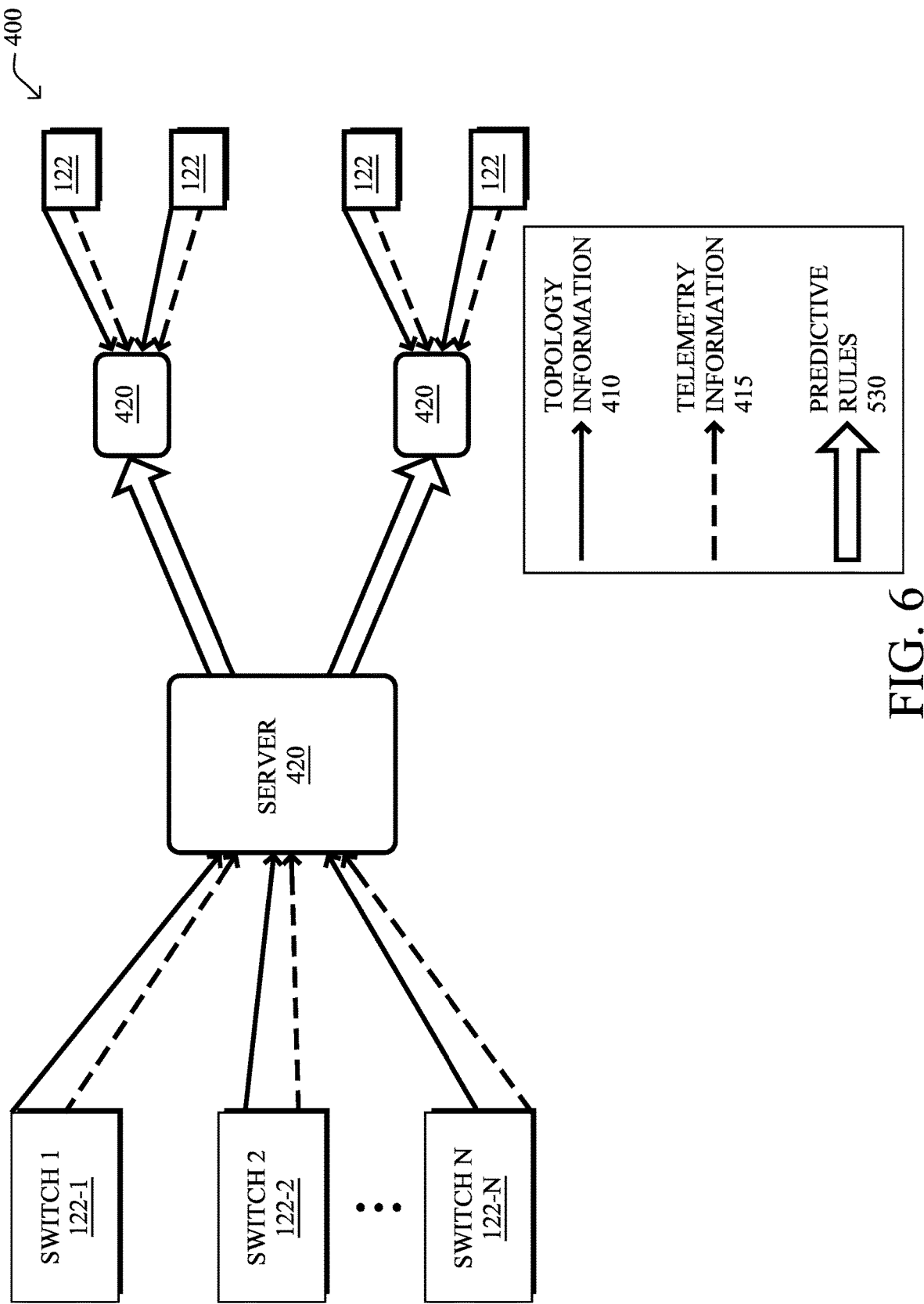
FIG. 6 illustrates an example exchange of predictive rules for predicting and mitigating layer-2 anomalies and instabilities.

The above pattern rules can then be used to predict and/or troubleshoot various layer-2 related issues, either by locally using the rules 530 on the server computing the rules, or else, as demonstrated in FIG. 6, by distributing the rules 530 to one or more other servers 520 for localized application of the rules in regards to correspondingly localized switches 122. The rules may be specifically trained to determine various predictions related to problematic layer-2 behaviors, such as the following example (and non-limiting) prediction outcomes:

- Probability that a specific MAC address gets connected to same port;
- Probability to be attached to a particular VLAN and IP subnet;
- Classifying a specific MAC address change as a user/MAC move;
- Classifying a specific MAC address as belonging to a gateway versus a host;
- Predicting average uptime of the MAC;
- Traffic pattern/behavior of the MAC;
- Etc.

The output of the machine learning algorithm could be used for various purposes. For example, one use-case as mentioned above is to differentiate an offending user from a legitimate user. In case of MAC flap (e.g., the same MAC is appearing in different ports or switches), the above data can be used to predict the correct switch/port and block the other port or dampen the MAC learning on those ports. The output from this phase may be used to predict the changes in the STP topology including state changes, or when a MAC address has permanently moved to a different port or switch. Still another use case is to leverage the pattern learned before certain layer-2 storm issues, and predict any new occurrence in order to take relevant mitigation action.

Figure 7:
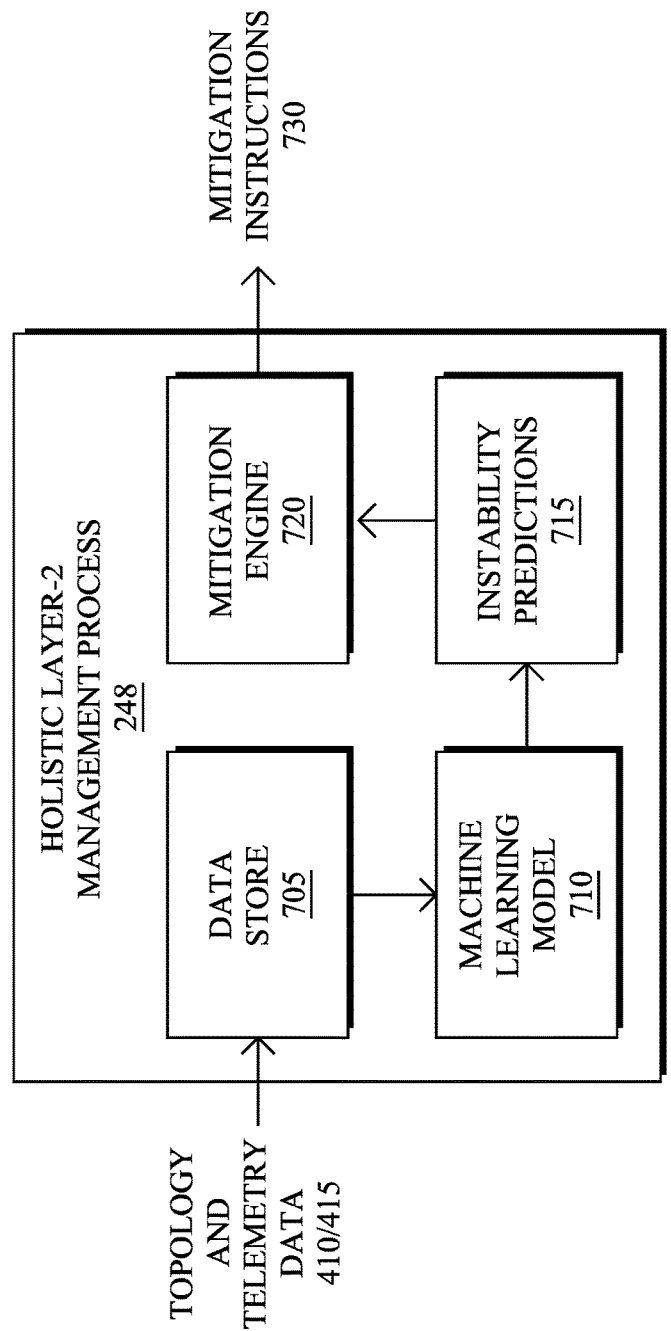
FIG. 7 illustrates an example of a device/process for predicting and mitigating layer-2 anomalies and instabilities.

The rules 530 that can be created from the learning can thus be configured to predict problematic layer-2 behaviors. As shown in FIG. 7, for example, the application of the rules 530 by a network device (e.g., server 420 through process 248) can involve receiving incoming data 410/415 and storing it in a data store 705, until applying the machine learning model 710 (rules 530). When a prediction of instability is reached (715), then one or more mitigation actions (mitigation engine 720) may then establish mitigation instructions 730 to correct or otherwise address (e.g., avoid, dampen, etc.) the instability. Illustrative examples of predictions for problematic behavior are such things as, for example:

1. Predicting the layer-2 control plane instabilities based on a sequence of control plane events (e.g., a potential layer-2 loop due to Spanning tree events);
2. Predicting the layer-2 control plane instabilities based on a sequence of data plane events (e.g., a potential layer-2 loop due to MAC address flapping between different ports);
3. Predicting data plane instabilities based on a sequence of data plane events (e.g., detecting malicious users based on MAC roaming events);
4. Predicting user data traffic patterns based on control plane events (e.g., traffic volume prediction based on STP events);
5. Predicting data traffic characteristics based on data plane events (e.g., expected traffic surges from a dual-homed server when specific network interface fails);
6. Predicting hardware resource utilization by correlating control plane and data plane events (e.g., predicting memory usage based on MAC address count over time, surges in MAC learning based on link/port state activities, etc.);
7. Etc.

Stated another way, as an example, according to one or more embodiments of the techniques herein, switches 122 may initially provide their layer-2 state and forwarding tables to a centralized server 420. This state snapshot may then be compared to previous snapshots to ensure the network is operating in a stable manner. Machine learning may be applied to the data to learn over time, e.g., which MAC addresses are typically sending traffic through which ports on the switch, which interface is used to reach the spanning-tree root bridge, which interfaces are STP blocking and which are forwarding. When a significant event occurs, for example, an STP state change, MAC flap between ports, or a new MAC address is learned, the centralized server may be provided with an updated snapshot. The historical state is then compared to the current state, and if the current state is determined to be invalid or abnormal, the network operator can be informed of the machine learning algorithms analysis, or the state of the network can be altered automatically by applying configuration changes or dynamically blocking certain users or control-plane traffic to return the state of the network to the normal condition.

Figure 8:
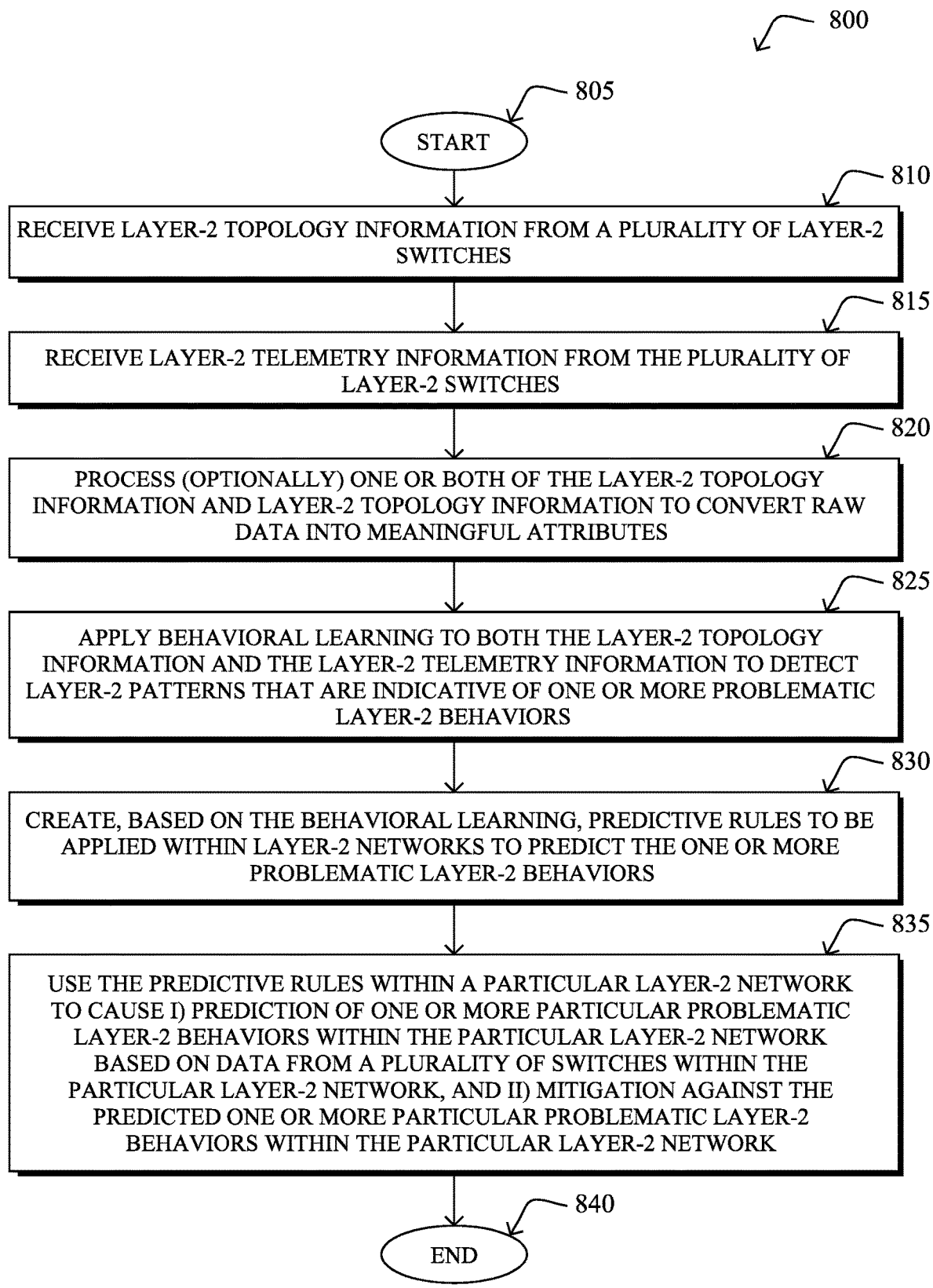
FIG. 8 illustrates an example simplified procedure for predicting and mitigating layer-2 anomalies and instabilities, particularly from the perspective of a server.

FIG. 8 illustrates an example simplified procedure for predicting and mitigating layer-2 anomalies and instabilities in accordance with one or more embodiments described herein, particularly from the perspective of a server. For example, a non-generic, specifically configured device (e.g., device 200, as a server) may perform procedure 800 by executing stored instructions (e.g., process 248). The procedure 800 may start at step 805, and continues to step 810, where, as described in greater detail above, a server 420 receives layer-2 topology information 410 from a plurality of layer-2 switches 122 (e.g., from a single layer-2 network or else from a plurality of different layer-2 networks). For example, the layer-2 topology information may be such things as spanning tree state, port state, connected devices, and so on. Also, in step 815, the server also receives layer-2 telemetry information 415 from the plurality of layer-2 switches, such as, e.g., local MAC table information, changes to MAC table information, event information related to changes to MAC table information, and others.

Note that as mentioned above, receiving either of the layer-2 topology information or layer-2 topology information (in the above steps or as mentioned further below) may be based on either a push model or a pull model between the server and the plurality of layer-2 switches. A hybrid model (e.g., both push and pull) may also be used, such as polling periodically for updates and pushing relevant changes as they occur, or else pulling the topology information and pushing the telemetry information, and any other suitable combination.

In step 820, the server may optionally process (prior to applying behavioral learning in step 825), one or both of the layer-2 topology information and layer-2 topology information to convert raw data into meaningful attributes for the behavioral learning, as described above. In step 825, in particular, the server may apply behavioral learning 520 to both the layer-2 topology information and the layer-2 telemetry information to detect layer-2 patterns that are indicative of one or more problematic layer-2 behaviors, such as, for example, MAC move, MAC flapping (e.g., between different ports), non-legitimate users, MAC flooding, layer-2 storms, MAC stale entry, MAC spoofing, etc. Note that the server may feed other useful information for the plurality of layer-2 switches (or otherwise) into the behavioral learning algorithms, such as VLAN information, ARP information, and so on. Accordingly, in step 830, the server may then create, based on the behavioral learning, predictive rules 530 to be applied within layer-2 networks to predict the one or more problematic layer-2 behaviors.

In step 835, the server may then "use" the predictive rules within a particular layer-2 network to cause i) prediction of one or more particular problematic layer-2 behaviors within the particular layer-2 network based on data from a plurality of switches within the particular layer-2 network, and ii) mitigation against the predicted one or more particular problematic layer-2 behaviors within the particular layer-2 network (e.g., one or more autonomous server-initiated layer-2 network changes). Note that as defined herein, "use" in this sense may imply that the server itself then receives the data from the plurality of switches within the particular layer-2 network, predicts the one or more particular problematic layer-2 behaviors within the particular layer-2 network based on the data and the predictive rules, and mitigates against the predicted one or more particular problematic layer-2 behaviors. Alternatively, "use" may imply sending the predictive rules to a second server for the particular layer-2 network, such that the second server receives the data from the plurality of switches within the particular layer-2 network, predicts the one or more particular problematic layer-2 behaviors within the particular layer-2 network based on the data and the predictive rules, mitigates against the predicted one or more particular problematic layer-2 behaviors.

The simplified procedure 800 may then end in step 840, notably with the opportunity to update the models used based on newly received information, or else to predict and mitigate further layer-2 issues, and so on.

Figure 9:
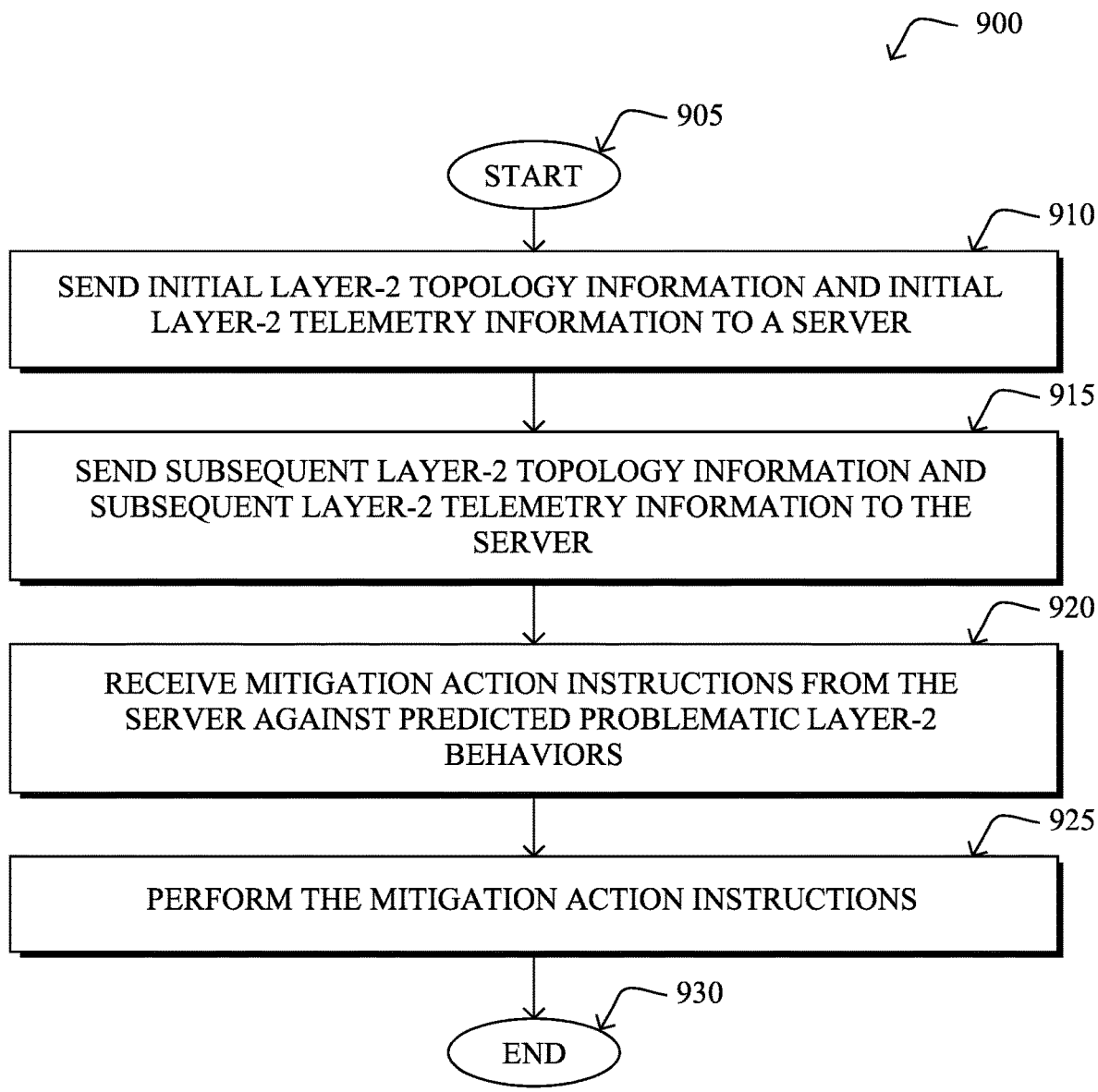
FIG. 9 illustrates another example simplified procedure for predicting and mitigating layer-2 anomalies and instabilities, here particularly from the perspective of a layer-2 switch.

In addition, FIG. 9 illustrates another example simplified procedure for predicting and mitigating layer-2 anomalies and instabilities in accordance with one or more embodiments described herein, particularly from the perspective of a layer-2 switch. For example, a non-generic, specifically configured device (e.g., device 200, as a switch) may perform procedure 900 by executing stored instructions (e.g., process 248). The procedure 900 may start at step 905, and continues to step 910, where, as described in greater detail above, a layer-2 switch 122 may send initial layer-2 topology information 410 and initial layer-2 telemetry information 415 to a server 420 to cause the server to, as described above, i) apply behavioral learning to both layer-2 topology information and layer-2 telemetry information from a plurality of layer-2 switches to detect layer-2 patterns that are indicative of one or more problematic layer-2 behaviors, and ii) create, based on the behavioral learning, predictive rules to be applied within layer-2 networks to predict the one or more problematic layer-2 behaviors.

In step 915, the layer-2 switch may send subsequent layer-2 topology information and subsequent layer-2 telemetry information to the server to cause the server to use the predictive rules to predict of one or more particular problematic layer-2 behaviors within the particular layer-2 network based on data from a plurality of switches within the particular layer-2 network, as also described above. Accordingly, in step 920, the switch may then receive mitigation action instructions from the server against the predicted one or more particular problematic layer-2 behaviors within the particular layer-2 network, which may be performed in step 925. The simplified procedure may then end in step 930. (Note that procedure 900 implies that the same switch both provides the initial information and subsequent information; however in other embodiments herein, this need not be the case.)

It should be noted that while certain steps within procedures 800-900 may be optional as described above, the steps shown in FIGS. 8-9 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 800-900 are described separately, certain steps from each procedure may be incorporated into each other procedure, and the procedures are not meant to be mutually exclusive.

The techniques described herein, therefore, predict and mitigate layer-2 anomalies and instabilities. In particular, the techniques herein correlate multi-dimensional inputs from networking devices such as control plane state, data plane state, hardware/software components, traffic patterns, etc., to provide a holistic view of a layer-2 environment and to predict layer-2 network instabilities (e.g., especially for overlay networks). Unlike conventional systems, the techniques herein look at multiple switches to build a model, and read information for multiple switches to detect problematic behavior. This is notable since oftentimes layer-2 behaviors are not happening or detectable on one device alone, so there may be a piece of a problem on a first device, another piece of the same problem on a second device, and still another piece on a third device, and so on. As such, the holistic view of the entire layer-2 network provides broader insight and capabilities (e.g., capacity planning, operational activities, etc.) than the simplistic methods that merely examine traffic patterns to move layer-2 traffic around problem areas that are potentially under attack, or else that only apply to layer-3 scenarios. Moreover, layer-2 predictions made according to the techniques herein can also be used to predict layer-3 control-plane instabilities.

Notably, in a layer-2 network, the forwarding semantic is a combination of the loop-free path built by the control-plane (e.g., STP) and the data-plane (e.g., MAC learning by forwarding frames). While the purpose of a layer-3 control-plane is to establish a loop-free path (as well as provide reachability information), in a layer-2 environment the control-plane only provides a loop-free path between switches participating in STP, and thus there is no control-plane oversight to control MAC learning behavior (and, notably, MAC forwarding loop problems can persist indefinitely because there is no concept of time-to-live in the layer-2 ethernet frame). Conventional anomaly detection mechanisms in layer-2 networks require network operators to study and understand reports, manually correlate them with current topology of the network, date plane and control plane state, devices connected, MAC address learning, etc., in order to validate the integrity of the anomaly reported, and to then manually take actions to remediate.

While there have been shown and described illustrative embodiments that provide for predicting and mitigating layer-2 anomalies and instabilities, it is to be understood that various other adaptations and modifications may be made within the spirit and scope of the embodiments herein. For example, while certain embodiments are described herein with respect to using certain layer-2 features for purposes of layer-2 issue and/or anomaly detection, the techniques are not limited as such and other features (layer-2 or otherwise) may be used, in other embodiments. In addition, while certain protocols are shown, such as STP, ARP, and so on, other suitable protocols may be used, accordingly. Still further, the techniques herein are not limited to the above-mentioned use cases.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
    receiving, at a server, layer-2 topology information from a plurality of layer-2 switches;
    receiving, at the server, layer-2 telemetry information from the plurality of layer-2 switches;
    applying, by the server, behavioral learning to both the layer-2 topology information and the layer-2 telemetry information to detect layer-2 patterns that are indicative of one or more problematic layer-2 behaviors;
    creating, by the server based on the behavioral learning, predictive rules to be applied within layer-2 networks to predict the one or more problematic layer-2 behaviors; and
    using, by the server, the predictive rules within a particular layer-2 network to cause i) prediction of one or more particular problematic layer-2 behaviors within the particular layer-2 network based on data from a plurality of switches within the particular layer-2 network, and ii) mitigation against the predicted one or more particular problematic layer-2 behaviors within the particular layer-2 network,
    wherein problematic layer-2 behaviors are selected from a group consisting of: media access control (MAC) move; MAC flapping; non-legitimate users; MAC flooding; MAC stale entry; MAC spoofing; and layer-2 storms.

2. The method as in claim 1, wherein using the predictive rules comprises:
    receiving, by the server, the data from the plurality of switches within the particular layer-2 network;
    predicting, by the server, the one or more particular problematic layer-2 behaviors within the particular layer-2 network based on the data and the predictive rules; and
    mitigating, by the server, against the predicted one or more particular problematic layer-2 behaviors.

3. The method as in claim 1, wherein using the predictive rules comprises:
    sending the predictive rules to a second server for the particular layer-2 network, wherein the second server receives the data from the plurality of switches within the particular layer-2 network, predicts the one or more particular problematic layer-2 behaviors within the particular layer-2 network based on the data and the predictive rules, mitigates against the predicted one or more particular problematic layer-2 behaviors.

4. The method as in claim 1, wherein the mitigation against the predicted one or more particular problematic layer-2 behaviors comprises one or more autonomous server-initiated layer-2 network changes.

5. The method as in claim 1, wherein the layer-2 topology information is selected from a group consisting of: spanning tree state; port state; and connected devices.

6. The method as in claim 1, wherein the layer-2 telemetry information is selected from a group consisting of: local media access control (MAC) table information; changes to MAC table information; and event information related to changes to MAC table information.

7. The method as in claim 1, wherein receiving one or both of the layer-2 topology information and layer-2 topology information is based on one or both of a push model or pull model between the server and the plurality of layer-2 switches.

8. The method as in claim 1, further comprising:
    feeding virtual local area network (VLAN) information for the plurality of layer-2 switches into the behavioral learning.

9. The method as in claim 1, further comprising:
    feeding address resolution protocol (ARP) information for the plurality of layer-2 switches into the behavioral learning.

10. The method as in claim 1, further comprising:
    processing, prior to applying behavioral learning, one or both of the layer-2 topology information and layer-2 topology information to convert raw data into meaningful attributes for the behavioral learning.

11. The method as in claim 1, wherein the plurality of layer-2 switches are from a plurality of different layer-2 networks.

12. A tangible, non-transitory, computer-readable medium storing program instructions that cause a computer to execute a process comprising:
    receiving layer-2 topology information from a plurality of layer-2 switches;
    receiving layer-2 telemetry information from the plurality of layer-2 switches;
    applying behavioral learning to both the layer-2 topology information and the layer-2 telemetry information to detect layer-2 patterns that are indicative of one or more problematic layer-2 behaviors;
    creating, based on the behavioral learning, predictive rules to be applied within layer-2 networks to predict the one or more problematic layer-2 behaviors; and
    using the predictive rules within a particular layer-2 network to cause i) prediction of one or more particular problematic layer-2 behaviors within the particular layer-2 network based on data from a plurality of switches within the particular layer-2 network, and ii) mitigation against the predicted one or more particular problematic layer-2 behaviors within the particular layer-2 network,
    wherein problematic layer-2 behaviors are selected from a group consisting of: media access control (MAC) move; MAC flapping; non-legitimate users; MAC flooding; MAC stale entry; MAC spoofing; and layer-2 storms.

13. The computer-readable medium as in claim 12, wherein using the predictive rules comprises:

receiving the data from the plurality of switches within the particular layer-2 network;

predicting the one or more particular problematic layer-2 behaviors within the particular layer-2 network based on the data and the predictive rules; and mitigating against the predicted one or more particular problematic layer-2 behaviors.

14. The computer-readable medium as in claim 12, wherein the process further comprises:

processing, prior to applying behavioral learning, one or both of the layer-2 topology information and layer-2 topology information to convert raw data into meaningful attributes for the behavioral learning.

15. The computer-readable medium as in claim 12, wherein the mitigation against the predicted one or more particular problematic layer-2 behaviors comprises one or more autonomous server-initiated layer-2 network changes.

16. The computer-readable medium as in claim 12, wherein:

the layer-2 topology information is selected from a group consisting of: spanning tree state; port state; and connected devices; and the layer-2 telemetry information is selected from a group consisting of: local media access control (MAC) table information; changes to MAC table information; and event information related to changes to MAC table information.

17. The computer-readable medium as in claim 12, wherein receiving one or both of the layer-2 topology information and layer-2 topology information is based on one or both of a push model or pull model with the plurality of layer-2 switches.

18. A method, comprising:

sending, from a layer-2 switch, initial layer-2 topology information and initial layer-2 telemetry information to a server to cause the server to i) apply behavioral learning to both layer-2 topology information and layer-2 telemetry information from a plurality of layer-2 switches to detect layer-2 patterns that are indicative of one or more problematic layer-2 behaviors, and ii) create, based on the behavioral learning, predictive rules to be applied within layer-2 networks to predict the one or more problematic layer-2 behaviors;

sending, from the layer-2 switch, subsequent layer-2 topology information and subsequent layer-2 telemetry information to the server to cause the server to use the predictive rules to predict of one or more particular problematic layer-2 behaviors within the particular layer-2 network based on data from a plurality of switches within the particular layer-2 network;

receiving, at the layer-2 switch, mitigation action instructions from the server against the predicted one or more particular problematic layer-2 behaviors within the particular layer-2 network; and performing, by the layer-2 switch, the mitigation action instructions, wherein problematic layer-2 behaviors are selected from a group consisting of: media access control (MAC) move; MAC flapping; non-legitimate users; MAC flooding; MAC stale entry; MAC spoofing; and layer-2 storms.

19. A method, comprising:

receiving, at a server, layer-2 topology information from a plurality of layer-2 switches;

receiving, at the server, layer-2 telemetry information from the plurality of layer-2 switches;

applying, by the server, behavioral learning to both the layer-2 topology information and the layer-2 telemetry information to detect layer-2 patterns that are indicative of one or more problematic layer-2 behaviors;

creating, by the server based on the behavioral learning, predictive rules to be applied within layer-2 networks to predict the one or more problematic layer-2 behaviors; and using, by the server, the predictive rules within a particular layer-2 network to cause i) prediction of one or more particular problematic layer-2 behaviors within the particular layer-2 network based on data from a plurality of switches within the particular layer-2 network, and ii) mitigation against the predicted one or more particular problematic layer-2 behaviors within the particular layer-2 network, wherein the layer-2 topology information is selected from a group consisting of: spanning tree state; port state; and connected devices.

20. A method, comprising:

receiving, at a server, layer-2 topology information from a plurality of layer-2 switches;

receiving, at the server, layer-2 telemetry information from the plurality of layer-2 switches;

applying, by the server, behavioral learning to both the layer-2 topology information and the layer-2 telemetry information to detect layer-2 patterns that are indicative of one or more problematic layer-2 behaviors;

creating, by the server based on the behavioral learning, predictive rules to be applied within layer-2 networks to predict the one or more problematic layer-2 behaviors; and using, by the server, the predictive rules within a particular layer-2 network to cause i) prediction of one or more particular problematic layer-2 behaviors within the particular layer-2 network based on data from a plurality of switches within the particular layer-2 network, and ii) mitigation against the predicted one or more particular problematic layer-2 behaviors within the particular layer-2 network, wherein the layer-2 telemetry information is selected from a group consisting of: local media access control (MAC) table information; changes to MAC table information; and event information related to changes to MAC table information.

* * * * *